Patented Nov. 23, 1948

2,454,376

UNITED STATES PATENT OFFICE 2,454,376

METHOD OF PURIFYING A RESINOUS LACTONE

Richard F. B. Cox, Wilmington, Del., assignor to Hercules Powder Company, Wilmington, Del., a corporation of Delaware No Drawing. Application July 28, 1945, Serial No. 607,667

10 Claims. (Cl. 260—344.6)

This invention relates to a process for the production and purification of a methoxy phenol lactone of the formula $C_{20}H_{22}O_7$ produced from pine wood resin. More particularly, it relates to a method for the production and purification of the sodium salts derived from said methoxy phenol lactone and to a method of purifying said lactone by crystallization as solvated crystals and to the crystalline solvate so obtained.

In accordance with this invention, it has been found that a colorless petroleum hydrocarbon-insoluble resin having approximately the following analyses: C 64.2%, H 5.9%, hydroxyl 13.6%, methoxyl 16.6%, and a saponification number 150, which corresponds to a methoxy phenol lactone or more specifically a diguaiacol hydroxy lactone of the formula $C_{20}H_{22}O_7$ is produced by saponifying a petroleum hydrocarbon-insoluble pine wood resin with sufficient alkaline sodium compound to produce a substantially neutral sodium salt solution, allowing the neutral sodium salt solution to become partially crystalline, removing and purifying the crystalline water-insoluble monosodium salt derived from said methoxy phenol lactone, acidifying said monosodium salt to liberate the said methoxy phenol lactone, forming a solution of the impure methoxy phenol lactone in a water-soluble monohydric alcohol containing two to four carbon atoms, crystallizing the methoxy phenol lactone in the form of a crystalline alcoholate, separating said crystalline methoxy phenol lactone alcoholate, and driving off the alcohol of solvation to recover the colorless resinous methoxy phenol lactone.

In order to produce this resinous methoxy phenol lactone, a pine wood resin containing from about 20% to about 95% gasoline-insoluble material is saponified with an alkaline sodium compound, sodium carbonate for example, in sufficient amount to produce a substantially neutral sodium salt solution containing from about 20% to about 70% total solids, the warm solution is allowed to crystallize, the crystalline monosodium salt which yields the methoxy phenol lactone is separated, purified and treated with dilute mineral acid, such as 10% sulfuric acid, to liberate the amber resinous methoxy phenol lactone and the amber resinous methoxy phenol lactone is recovered.

The amber resinous methoxy phenol lactone is rendered substantially colorless by dissolving with heat in sufficient water-soluble monohydric alcohol, isopropyl alcohol, for example, to make a solution suitably of about 30% to about 40% concentration. The solution is filtered in any suitable manner, clarified, cooled, and seeded, if necessary, to get crystals. The crystalline alcoholate of the methoxy phenol lactone is removed by filtration and, after washing with cold isopropyl alcohol, is dried. The colorless methoxy phenol lactone in resinous form is obtained, if desired, by distilling off the alcohol of solvation. The crystalline monosodium salt from which the methoxy phenol lactone is derived is purified in the above-described process when the crude salt contains water-insoluble impurities such as dust, sand, dirt, wood chips, and the like by converting said crystalline monosodium salt into a water-soluble polysodium salt solution containing from about 5% to about 55% total solids by reacting said monosodium salt with sodium hydroxide, filtering, or in any suitable manner clarifying said polysodium salt solution, lowering the pH of the solution to a pH within the range of about six to about eight to cause the monosodium salt to crystallize from the solution, and recovering said crystalline monosodium salt.

The methoxy phenol lactone with which this invention is concerned is a resin of the formula $C_{20}H_{22}O_7$ which is readily converted into the crystalline-insoluble monosodium salt of the formula $C_{20}H_{25}O_9Na$ by a saponification reaction with an alkaline sodium compound and is readily obtained from said monosodium salt by acidification. While the structure of the methoxy phenol lactone has not been established, it is known to give on acetylation a triacetate melting at 161.3°–161.9° C., specific rotation $[\alpha]_D$ —118.8° (5% in chloroform), showing the presence of three hydroxyl groups in the molecule. By ethylation, only two of these hydroxyl groups are converted to ethoxy groups, thus showing that only two of the three hydroxyl groups are phenolic hydroxyl groups. Oxidation of the diethyl ether thus formed gives 4-ethoxy-3-methoxy benzoic acid, showing that the methoxy groups are adjacent to the phenolic hydroxyl groups in the benzene rings of the methoxy phenol lactone and that the methoxyl and phenolic hydroxyl groups are present in guaiacol radicals. Since there are thus two guaiacol radicals, the replacement of the two $C_7H_7O_2$ or guaiacol radicals by two hydrogen atoms leaves $C_6H_{10}O_3$ as the parent nucleus. This nucleus contains the nonphenolic hydroxyl group and the lactone group and thus may be more exactly written $C_5H_9(OH)COO'$. The structure of this hydroxy lactone nucleus has not been ascertained. However, the methoxy phenol lactone, on the basis of the above facts, is more specifically designated a diguaiacol hydroxy lactone. Wherever the name "methoxy phenol lactone" is used in this specification, the hereinabove-described diguaiacol hydroxy lactone is referred to.

In order that those skilled in the art may better understand how the present invention may be carried into effect, the following specific examples are given. All of the proportions are given in parts by weight.

*Example I*

Five thousand parts pine wood resin extracted from pine tree stumps by benzene and containing about 20% gasoline-insoluble material was converted into a neutral sodium salt solution in 10,000 parts 50% alcohol solution. After standing several weeks at 5° C., the crystalline salt amounting to 48.2 parts and analyzing 5.1% sodium was separated. This monosodium salt was dissolved in 110 parts 5% sodium hydroxide and filtered. The filtrate was then acidified by passing carbon dioxide through the hot solution. The resulting precipitate was removed by filtration and was washed with cold water.

The purified monosodium salt was then suspended in methanol and acidified with concentrated hydrochloric acid and heated for 15 minutes at 60° C. The resulting solution was diluted with water to precipitate an amber gasoline-insoluble resin which formed a triacetate melting at 161.5° C. when treated with acetic anhydride. The purified monosodium salt had the following analyses: C 56.4%, H 5.94%, methoxyl 14.5%, sodium 5.3%, $[\alpha]_D+8°$ (0.5% in water), solubility in water 2.3% at 100° C., and 0.6% at 60° C.

Four parts of the amber gasoline-insoluble resin was dissolved in eight parts of isopropyl alcohol and allowed to stand for 24 hours. Crystals which formed were separated by filtration and were recrystallized from isopropyl alcohol. They melted at 80–81° C. with loss of isopropyl alcohol.

*Example II*

Forty thousand parts of a pine wood resin containing about 64% gasoline-insoluble material was melted and held at 105° C. while 22,500 parts 20% sodium carbonate solution was added slowly with stirring to prevent foaming over. The resulting sodium salt solution was held for eight hours at a temperature within the range of about 85° C. to about 100° C. The hot solution was then filtered through a filter press. The crude filter cake so obtained was suspended in sufficient water to make a slurry of about 50% solids. This slurry was filtered to obtain 388 parts of a crystalline water-insoluble monosodium salt (dry basis) which analyzed 14.4% methoxyl and 5.3% sodium.

Two hundred parts of the crystalline water-insoluble monosodium salt obtained from a gasoline-insoluble pine wood resin in the above-described manner was added to 1,000 parts of a 10% sulfuric acid solution, and the suspension was heated at 90° C. to 100° C. for one hour. The resin which was liberated from the salt separated, and the aqueous layer was then decanted. The resin was washed with water to remove the sulfuric acid. The remaining resin was heated at 140° C. to drive off water droplets which remained. This resin was crude methoxy phenol lactone, dark in color, melting (Hercules drop method, at 85° C. to 88° C., and having a methoxyl content of 15.2% to 15.5%.

A solution of 13 parts of this crude, dark methoxy phenol lactone dissolved in 25 parts isopropyl alcohol was clarified by filtration at 60° C. The solution was then held at about 24° C. for 16 hours. The crystals which formed were removed by filtration and dried at 30° C. in trays. They contained alcohol of crystallization which was not removed in this drying operation. The dried crystalline methoxy phenol lactone isopropylate melting at about 80° C. amounted to 13.7 parts. Analytically pure crystals melted at 80° C. to 81° C. and had a specific rotation of $[\alpha]_D -47°$. The carbon-hydrogen analysis (C, 63.9%; H, 7.04%; and methoxyl analysis (21.4% OCH$_3$) corresponded to $C_{20}H_{22}O_7 \cdot C_3H_7OH$, wherein the isopropyl alcohol of solvation analyzes as though it were a methoxyl group. The loss in weight at 100° C. in vacuo amounted to 13.6%, and the residue from this drying operation was the methoxy phenol lactone in the form of a water-white resin.

*Example III*

Three hundred seventy-six parts of the monosodium salt, isolated from gasoline-insoluble pine wood resin in the manner described in Example II, was suspended in 780 parts of isopropyl alcohol. To this suspension at 60° C. was added 118 parts of concentrated hydrochloric acid (specific gravity, 1.18) with rapid agitation. The resin which was produced dissolved in the isopropyl alcohol and sodium chloride separated from the solution. After filtering the hot solution, it was cooled to 20° C., seeded with crystals of methoxy phenol lactone isopropylate, and stirred for 16 hours. The crystals which formed were filtered out and dried at 30° C. They amounted to 197 parts.

After removing the crystalline methoxy phenol lactone isopropylate, 175 parts more of the crystalline sodium salt was added to the filtrate and 60 parts concentrated hydrochloric acid was added with stirring at 60° C. After filtration to remove sodium chloride, the solution was cooled and seeded as before to obtain another crop of methoxy phenol lactone isopropylate, which, after drying, amounted to 145 parts by weight. The crystalline isopropylate was heated at 190° C. to 200° C. under a carbon dioxide atmosphere to drive off the alcohol of crystallization. The resulting resin had the following analysis: Acid number, 5 to 10; melting point (Hercules drop method for resins), 90° C.; color, about 35 Amber (Lovibond scale). After repeating the crystallization from isopropyl alcohol and removal of the alcohol from the alcoholate, a resin having a color of 5 Amber was obtained.

*Example IV*

Four parts by weight of resinous methoxy phenol lactone obtained as in Example II was dissolved in eight parts of n-propyl alcohol by heating at 60° C. The crystals which formed at 27° C. amounted to four parts by weight, melted at 69° C. to 70° C., and contained n-propyl alcohol of crystallization.

*Example V*

Four parts by weight of resinous methoxy phenol lactone obtained as in Example II was dissolved in five parts of ethyl alcohol by heating at 60° C. The crystals which formed at 27° C. amounted to two parts by weight, melted at 64.5° C. to 65.5° C., and contained ethyl alcohol of crystallization.

*Example VI*

Five parts by weight of resinous methoxy phenol lactone obtained as in Example II was dissolved in 10 parts of tert-butyl alcohol by heating at 60° C. The crystals which formed at 25° C. amounted to 4.5 parts by weight, melted at 71° C. to 72° C., and contained tert-butyl alcohol of crystallization.

In the examples given above, it is seen that the methoxy phenol lactone is isolated from pine wood resin in the form of a monosodium salt. The yield of this crystalline sodium salt will depend to a large extent upon the amount of material in the gasoline-insoluble pine wood resin which yields the methoxy phenol lactone. Since the methoxy phenol lactone is a gasoline-insoluble material, it will be found, to the largest extent, in those pine wood resins containing the largest amount of gasoline-insoluble material.

An example of a pine wood resin which will yield the crystalline sodium salt in small amounts is the resin obtained by extracting pine wood chips with benzene. This extract consists of pale rosin, gasoline-insoluble resinous material, and color bodies. Such an extract usually contains about 20% gasoline-insoluble resinous material.

For more economical operation, it may be desirable to separate the gasoline-insoluble material from the benzene extract of the pine wood chips by dissolving the rosin and leaving a residue which is about 85% gasoline-insoluble. Such a residue is particularly satisfactory to saponify for the preparation of the crystalline sodium salt solution from which the methoxy phenol lactone can be derived.

The methoxy phenol lactone can also be obtained from that dark-colored fraction obtained in the refining of impure wood rosin to pale grades by means of a selective solvent for color bodies, such as furfural. Such a fraction contains at 30%, and up to about 80% by weight of a gasoline-insoluble resinous material and will yield about 1% crystalline sodium salt.

Due to the greater solubility of the methoxy phenol lactone in water, a resin rich in methoxy phenol lactone may also be obtained by extracting a pine wood resin containing from about 30% to about 95% petroleum hydrocarbon-insoluble material and containing also a methoxy phenol lactone in the liquid phase with water at a temperature of about 150° C. to about 250° C. The methoxy phenol lactone dissolves in the hot water and separates on cooling or evaporating the aqueous extract. The water may thus be recycled and the extract may be converted into a sodium salt solution from which the insoluble monosodium salt derived from the methoxy phenol lactone will precipitate. In some cases the extract will be rich enough in the methoxy phenol lactone to be crystallized from an alcohol, isopropyl alcohol for example.

A resin, which on saponification will yield the crystalline sodium salt from which the methoxy phenol lactone may be obtained, may also be extracted from gasoline-extracted pine wood chips by means of alcohol, benzene, acetone, aqueous ammonum hydroxide solution, dilute caustic solutions, etc.

The resins can be converted into the sodium salt by saponification with an alkaline sodium compound such as NaOH, $Na_2CO_3$, NaOAC, etc., or by treatment of a soluble salt solution (e. g. potassium salt) with an aqueous sodium salt solution such as a sodium chloride or sodium sulfate solution.

While the saponification may be carried out in aqueous or alcoholic solutions at room temperature and lower in the case of sodium hydroxide, the saponification is usually carried out in aqueous solution at temperatures within the range of 85° C. to 120° C.

The crude crystalline monosodium salt derived from the methoxy phenol lactone has a solubility of about 2.3% in water at 100° C. and about 0.6% in water at 60° C. When sodium hydroxide is added the solubility is greatly increased by forming a disodium salt and a trisodium salt apparently through salt formation with the phenolic groups. The polysodium salt may also be isolated as a crystalline material, if desired. The formation of a soluble polysodium salt solution may also be made use of in extracting the methoxy phenol lactone from wood chips especially those from which the rosin has been removed by gasoline extraction.

Since the polysodium salt solution is quite sensitive to oxidation by air, it is advantageous to protect it with an inert atmosphere.

The polysodium salt is reconverted to the monosodium salt by lowering the pH to a pH within the range of about six to about eight. This may be accomplished by acidification with carbon dioxide, acetic acid, hydrochloric acid, sulfuric acid, phosphoric acid, sodium bisulfate, sodium acid phosphate, etc. It is preferable to carry out the acidification cautiously at a temperature within the range of about 60° C. to about 100° C. in order that the monosodium salt will be in the form of large easily filtered crystals.

The crystalline sodium salt obtained from gasoline-insoluble pine wood resin in the manner described above may be converted to the resinous methoxy phenol lactone by acidification in aqueous or alcoholic solution or supension by any strong mineral acid, such as sulfuric acid, hydrochloric acid, phosphoric acid, or acid salts, such as sodium acid sulfate. The resin may then be worked up in any known method such as extraction, crystallization from alcohol, etc.

As shown in the above examples, the crystalline sodium salt may be converted to the resin directly in the alcohol from which the methoxy phenol lactone may be crystallized. The crude resinous methoxy phenol lactone, obtained in any other manner, may be dissolved in any suitable alcohol from which it may be crystallized. Suitable alcohols are ethyl alcohol, n-propyl alcohol, isopropyl alcohol, and tert-butyl alcohol. The methoxy phenol lactone crystallizes from these alcohols containing alcohol of crystallization and are called ethylates, propylates, butylates, etc. They have the following properties:

|  | Melting Point | Solubility in Corresponding Alcohol |
|---|---|---|
|  | °C. |  |
| Methoxy Phenol Lactone Ethylate. | 64.5–65.5. | Very soluble. |
| Methoxy Phenol Lactone Propylate. | 69–70. | Soluble. |
| Methoxy Phenol Lactone Isopropylate. | 80–81. | 3% (25° C.), about 40% (60° C.). |
| Methoxy Phenol Lactone Tert-butylate. | 71–72. | Insoluble. |

The alcoholate may be crystallized from the alcohol solution at any temperature below the melting point of the corresponding methoxy phenol lactone alcoholate. In the case of an isopropyl alcohol solution, this temperature is quite conveniently about 15° C. to about 25° C.

Small amounts of water in the alcohol, such as the water which might be introduced in the acidification of the sodium salt, are not objectionable. However, the accumulation of water, as in the re-use of the alcohol solvent, will limit the number of times that the solvent can be re-used without removal of the water.

The methoxy phenol lactone alcoholates may be used as such for some purposes, such as in the addition of the resin to cellulose acetate or ethyl cellulose in a lacquer solvent, since the alcohol in the alcoholate will not be objectionable. However, in case the methoxy phenol lactone is desired in a resinous state, the alcohol of crystallization may be removed by evaporation at any temperature above the melting point of the alcoholate and up to about 200° C. The removal may be facilitated by use of reduced pressure, blowing with an inert gas, such as carbon dioxide, nitrogen, superheated steam, etc. The resin obtained by distilling the alcohol from methoxy phenol lactone isopropylate usually has the color of about 2 to 3 Amber, an acid number of 10 a saponification number of 169, and a methoxyl content of 16.4%.

What I claim and desire to protect by Letters Patent is:

1. As a new composition of matter a crystalline alcoholate of the diguaiacol hydroxy lactone having the formula $C_{20}H_{22}O_7$ and having a crystalline triacetate melting at about 161–162° C.

2. As a new composition of matter a crystalline isopropylate of the diguaiacol hydroxy lactone having the formula $C_{20}H_{22}O_7$ and having a crystalline triacetate melting at about 161–162° C.

3. As a new composition of matter a crystalline tert-butylate of the diguaiacol hydroxy lactone having the formula $C_{20}H_{22}O_7$ and having a crystalline triacetate melting at about 161–162° C.

4. As a new composition of matter a crystalline n-propylate of the diguaiacol hydroxy lactone having the formula $C_{20}H_{22}O_7$ and having a crystalline triacetate melting at about 161–162° C.

5. The method of producing a substantially colorless diguaiacol hydroxy lactone of the formula $C_{20}H_{22}O_7$ isolated from gasoline-insoluble pine wood resin which comprises forming a solution of said diguaiacol hydroxy lactone containing traces of color bodies in a water-soluble monohydric alcohol containing two to four carbon atoms, crystallizing said diguaiacol hydroxy lactone in the form of an alcoholate, separating said crystalline alcoholate, and removing the alcohol of crystallization from said alcoholate.

6. The method of producing a substantially colorless diguaiacol hydroxy lactone of the formula $C_{20}H_{22}O_7$ isolated from gasoline-insoluble pine wood resin which comprises forming a solution of said diguaiacol hydroxy lactone containing traces of color bodies in isopropyl alcohol, crystallizing said diguaiacol hydroxy lactone in the form of an isopropylate, separating said crystalline isopropylate, and removing the alcohol of crystallization from said isopropylate.

7. The method of producing a susbtantially colorles diguaiacol hydroxy lactone of the formula $C_{20}H_{22}O_7$ isolated from gasoline-insoluble pine wood resin which comprises forming a solution of said diguaiacol hydroxy lactone containing traces of color bodies in tert-butyl alcohol, crystallizing said diguaiacol hydroxy lactone in the form of a tert-butylate, separating said crystalline tert-butylate, and removing the alcohol of crystallization from said tert-butylate.

8. The method of producing a substantially colorless diguaiacol hydroxy lactone of the formula $C_{20}H_{22}O_7$ isolated from gasoline-insoluble pine wood resin which comprises forming a solution of the diguaiacol hydroxy lactone containing traces of color bodies in n-propyl alcohol, crystallizing said diguaiacol hydroxy lactone in the form of an n-propylate, separating said crystalline n-propylate, and removing the alcohol of crystallization from said n-propylate.

9. The method of producing a substantially colorless diguaiacol hydroxy lactone of the formula $C_{20}H_{22}O_7$ which comprises converting a substantially hydrocarbon-insoluble pine wood resin which on saponification yields a water-insoluble crystalline salt derived from said lactone into a substantially neutral sodium soap by saponification with an alkaline sodium compound at a temperature within the range of about 85° C. to about 120° C., allowing the water-insoluble monosodium salt drived from said diguaiacol hydroxy lactone to crystallize from said soap solution, separating said crystalline monosodium salt from said soap solution, liberating said diguaiacol hydroxy lactone by acidification of said monosodium salt with a mineral acid compound, forming a solution of the liberated diguaiacol hydroxy lactone in a water-soluble monohydric alcohol containing two to four carbon atoms, crystallizing said diguaiacol hydroxy lactone in the form of an alcoholate, separating said crystalline alcoholate, and removing the alcohol of crystallization from said alcoholate.

10. The method of producing a substantially colorless diguaiacol hydroxy lactone of the formula $C_{20}H_{22}O_7$ which comprises converting a substantially hydrocarbon-insoluble pine wood resin which on saponification yields a water-insoluble crystalline salt derived from said lactone into a substantially neutral sodium soap by saponification with an alkaline sodium compound at a temperature within the range of about 85° C. to about 120° C., allowing the water-insoluble monosodium salt derived from said diguaiacol hydroxy lactone to crystallize from said soap solution, separating said crystalline monosodium salt, redissolving said crystalline monosodium salt in a sufficient amount of sodium hydroxide solution to form a polysodium salt solution, separating insoluble solid impurities, lowering the pH of the clarified polysodium salt solution to a pH within the range of about six to about eight to cause the monosodium salt to crystallize, separating said monosodium salt in a purified state, liberating said diguaiacol hydroxy lactone by acidification of said monosodium salt with a mineral acid compound, forming a solution of the liberated diguaiacol hydroxy lactone in a water-soluble monohydric alcohol containing two to four carbon atoms, crystallizing said diguaiacol hydroxy lactone in the form of an alcoholate, separating said crystalline alcoholate, and removing the alcohol of crystallization from said alcoholate.

RICHARD F. B. COX.

REFERENCES CITED

The following references are of record in the file of this patent:

UNITED STATES PATENTS

| Number | Name | Date |
| --- | --- | --- |
| 2,102,380 | Pasternack | Dec. 14, 1937 |
| 2,221,540 | Hall | Nov. 12, 1940 |
| 2,355,782 | Cox | Aug. 15, 1944 |
| 2,360,205 | Cox | Oct. 10, 1944 |

Certificate of Correction

Patent No. 2,454,376.        November 23, 1948.

RICHARD F. B. COX

It is hereby certified that errors appear in the printed specification of the above numbered patent requiring correction as follows:

Column 2, line 51, for that portion of the formula reading "COO)" read *(COO)*; column 3, line 71, for "method," read *method)*; column 4, line 11, Example II, for "7.04%;" read *7.04%)*; column 5, line 38, Example VI, for "at 30%" read *at least 30%*; column 7, line 62, claim 7, for "colorles" read *colorless*; column 8, line 18, claim 9, for "drived" read *derived*;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*